A. F. MENEFEE.
Mill Bolt.
No. 7,174.
Patented March 12, 1850.
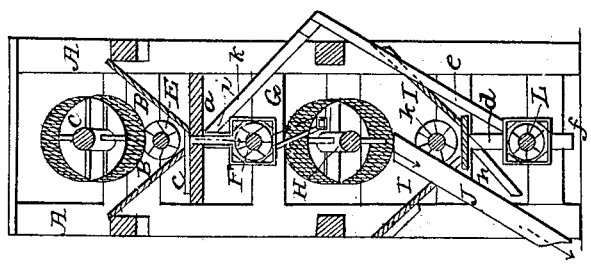
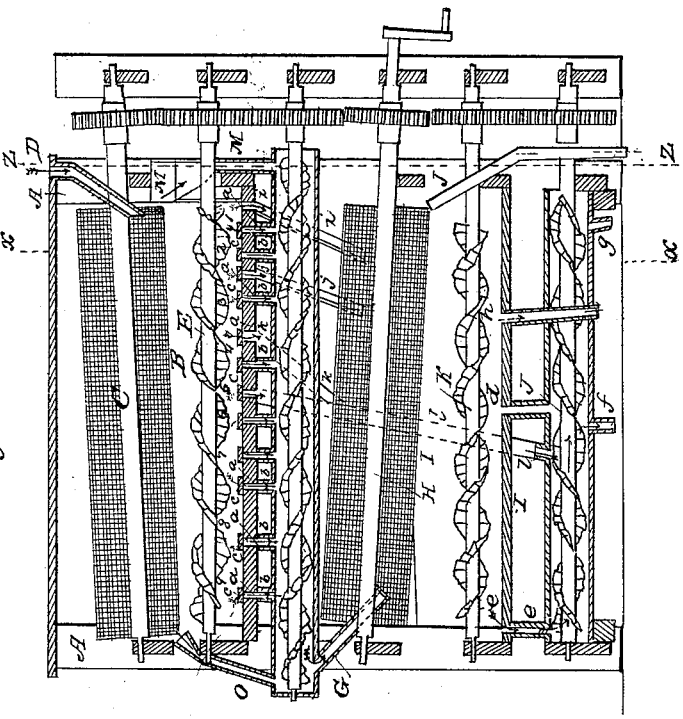
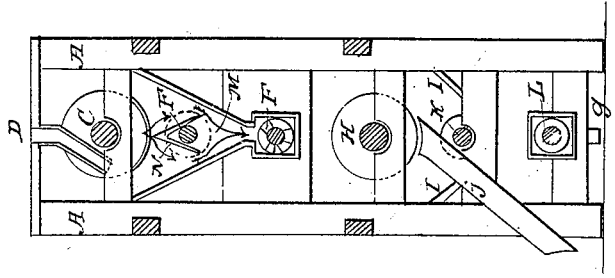

UNITED STATES PATENT OFFICE.

ALEX. F. MENEFEE, OF WOODVILLE, VIRGINIA.

FLOURING-MILL.

Specification of Letters Patent No. 7,174, dated March 12, 1850.

*To all whom it may concern:*

Be it known that I, ALEXANDER F. MENEFEE, of Woodville, in the county of Rappahannock and State of Virginia, have invented certain new and useful Improvements in the Machinery for Bolting Flour; and I do declare that the following is a full, clear, and exact description of the same, reference being had to the annexed drawing, making a part of this specification, in which—

Figure 1, is a longitudinal section, Fig. 2, is a cross section through X, X, Fig. 3, a cross section through Z, Z.

In the accompanying drawing B and I are bolting chests.

E and K are flour conveyers.

C and H are bolting reels.

F and L, are conveyers inclosed in tight boxes.

$i$ and $j$ are spouts running from B, to separate divisions of the packing chest.

$k$ and $l$, are spouts which uniting into one pass over H into L, at any point between the tail of L and $f$.

$b, b, b$, &c., are short spouts or pipes passing from B into F. $a, a, a$, &c., are the mouths in the bottom of B, of $i, j, k, l, b, b, b$, &c.

$c, c, c$, &c., are slides fitting closely over the mouths of $j, k, l, b, b, b$, &c.

D, is a spout from the flour elevator into the head of C.

N is a plate, between the inner and outer ceiling of B astride of the shaft of E and under the head of C.

M is a spout from N into F.

O is a spout from B and the tail of C into F.

G is a spout from F into I and the head of H.

J is a spout from I and the tail of H to any part of the mill.

$e$ and $d$, are pipes from the bottom of I into L, $e$ being at the head and $d$, in the middle of I. $h$, is a spout half way between $d$, and the tail of I and passes to any part of the mill.

$f$ is a spout 3 inches nearer the tail of L than the entrance of $d$, and passes to the flour elevators.

$g$, is a spout from the head of L to the eye of the burs.

C, H, E, F, K, L are hung on gudgeons and connected with the machinery of the mill by cog wheels. Upon C should be cloth of the finest quality. Upon H cloth of the finest quality from its head to $d$. Cloth of No. 8 or 9 from $d$, to $h$, and cloth No. 0, from $h$, to its tail.

The defects in the heretofore existing bolting machinery are first, that it does not give any power to regulate, with exactness and uniformity, the process of bolting, so that flour of the desired quality may at all times be made, and offal and bran of the desired description passed off. Second, that by it, only one quality of merchantable flour could be made at one time. Third, that by it, the fine middlings, which require regrinding and re-bolting, had to be passed off, from the machinery, and when accumulated in large quantities to be re-ground and re-bolted; and the flour obtained from them, not being merchantable, had to be mixed with better flour, reserved for that purpose, by manual labor, so as to be made merchantable—a process laborious and often unsuccessful. Fourth, that by it, in the re-bolting of those middlings, the meshes of the bolt, choke and fill up, because there is not bran enough in the middlings to keep the meshes of the bolt clear, and they have to be opened by switching, &c. Fifth, by it, the unbolted flour, blown out of the head of bolt C at D, falls on the shaft or gudgeon of E, and from thence partly into B at $i$, to the injury of the flour passing to the packing chest, and partly upon the mill floor, from whence it is removed by hand.

By means of my improvements these defects are entirely removed. By the spout $j$, placed about three feet from $i$, power is given to pass through it. Superfine flour, at the same time that family flour is passed through $i$ by its slide $c$, it can be opened or closed at pleasure, it can be used with advantage only when good white wheat is being ground.

By the two spouts $k, l$ ($k$ being about two feet from $j$ and $l$ two feet from $k$,) and the pipes $b$ $b$ &c., control is given over the quality of the flour passed through $i$, or $i$ and $j$, and likewise over the action and the products of H and over the quality, &c., of that retained over H to L. The value of two spouts over one, results from the inequalities in the quantity and quality of the flour in B, occasioned by different speeds of grinding, and by the differences in the quality and condition as to dryness, &c., of the wheat. When the flour in B is good, $k$ will be closed and $l$ opened, and a larger quantity passed to the packing chest; when the flour is bad $l$, will be closed and $k$, opened and less passed to the packing chest, and when the flour is such, that the opening of $k$, does not sufficiently limit the quantity passed to the packing chest, the opening of $b^3$, or $b^2$, or $b^1$, will do so. $k$ and $l$, controlled by $b$, $b$, &c., gives an equal discretion over the quality, &c., of the flour returned over I into L.

The tubes $b^1$, and $b^2$, are placed between $i$ and $j$, and $b^3$, between $j$ and $k$, for the purpose just mentioned. $b^4$ is placed between $l$ and $k$, to act on $k$, and $b^5$, $b^6$, $b^7$, $b^8$, $b^9$, (which are from twelve to eighteen inches apart) are placed between $l$, and the tail of the bolt to act on $l$, when it is open or $k$, when $l$ is closed. And these pipes $b$, $b$ &c. not only furnish the power over the flour passed through $k$, $l$, $j$, $i$ as mentioned, but likewise, give discretionary control, over the action of H, and the quality of its products, (viz: inferior flour, middlings and bran,) by allowing the passage of any portion of the flour in B into F, from whence it passes into H. By the slides $c$, $c$ &c. over the mouth of $k$, $l$, $b$, $b$, &c. they can be opened and closed at discretion.

As the quality of the flour in chest B varies from the causes stated, and also decreases progressively in richness from the head to the tail of the bolt C, the miller will be governed in the use of these pipes (that is determining which he will open and which shut) by the quality of the flour in B, and also by his wishes and purposes concerning the quality of the flour, &c., manufactured, when the flour is bad, he will open the pipes nearer the spouts open and in use, when it is good he will close the nearer pipes and close those farther from the open spouts. And when he wishes to make superior flour will open the tubes nearer to $i$, than when he is content to make inferior flour. Another advantage obtained from these spouts and tubes is that the same results can be produced by them as would be the consequence of shortening or lengthening at will, bolt C.

By interposing boxed conveyer F, between, and connecting it as stated with, B and I, and causing the flour passed into F by M and $b$, $b$, &c. and the bran passed into F by O, to mingle and pass together through G into bolt H, the choking of the meshes of H is prevented and the flour fully bolted, separated &c. By the spout $g$, the fine middlings are carried to the burs mingled and re-ground with the wheat, and all necessity of their separate regrinding and its consequences avoided. By plate N and spout M the unbolted flour blown from the head of C, is prevented from falling into B, and on the mill floor, and is carried into F.

By means of the combinations and additions afore described the flour in B is separated at the mill of the miller, and such portion as (and neither more or less, than) he pleases, is passed into the packing chest through $i$, and when the quality of the wheat permits, family flour, through $i$, and superfine flour through $j$, can be made at one time; and any desired portion of the residue is carried over I, into L by $h$ or $l$; and any portion more or less of that residue is poured through $b$, $b$, &c. into F. And in F the flour from $b$, $b$, &c., is mingled with the unbolted flour from M, and the bran from O and passed through C into I and bolt H where it is thoroughly bolted, the bran through J and the offal through $h$ is passed off in any desired condition as to richness, the flour passes through $e$, into L to mingle them with the flour from $k$ or $l$, and to pass thence through $f$ to the flour elevators, and the coarse middlings through $d$ into L, and thence through $g$, to the burs. And the whole process of bolting and separating the flour from its bran and offal is a continuous and entire act, by machinery and without any of the manual labor before mentioned; and at all times and in every part under the discretionary power of the miller.

The annexed drawings are of a machine with reels of 13 feet in length. The size and proportions of the other portions of the machinery must be governed by the length of the reels. When reels of greater length are used no other changes in the machinery besides a corresponding enlargement of its proportions, would be required except an increase of the number of the pipes $b$, $b$ according to the increased length of chest B. The several parts of the machine are constructed in the usual manner.

Perhaps statements of a few modes of working this machinery may explain its action more clearly. When grinding rapidly with 2 pair of burs, to make superfine flour with average red wheat, I close spouts $j$, and $k$, and tubes $b^1$, $b^2$, $b^3$, and $b^4$, open spout $l$, close $b^5$, $b^6$, $b^7$, and open $b^8$ and $b^9$, which will make 20 barrels superfine flour out of every 90 bushels of wheat. If the wheat is inferior I also open $b^7$ and $b^4$ &c. When grinding rapidly with one pair of burs to make superfine flour out of average red wheat I close spouts $j$ and tubes $b^1$, $b^2$, $b^3$, and $b^4$, open spout $k$, close spout $l$ and tubes $b^5$, $b^6$ and open tubes $b^7$, $b^8$ and $b^9$. If the wheat is inferior, or the speed of grinding slow &c. I open tubes $b^6$, and $b^3$ &c. When grinding rapidly to make family flour out of good white wheat, I close tubes $b^1$, $b^2$, open spout $j$, close spout $k$, and tubes $b^3$ and $b^4$, open spout $l$, close tubes $b^5$, $b^6$ and open $b^7$, $b^8$, and $b^9$, and make family flour through spout $i$ and superfine through spout $j$, making 16 or 17 barrels family flour and 3 or 4 superfine out of every 90 bushels wheat &c.

Many different combinations will be required and are in the discretion &c. of the miller.

Having thus described the manner in which I construct my improved flour bolting machine and the operations thereof, what I claim therein as new and desire to secure by Letters Patent is—

1. The manner herein stated in which I have arranged and combined the spouts $i$, $j$, $k$, $l$ and tubes $b^1$, $b^2$, $b^3$, $b^4$, &c., and their slides $c$, $c$, $c$, $c$, &c., with each other, and with the bottom of chest B, and with the boxed conveyers F and L, by which complete control is obtained over the quality of the flour passed into the packing chest, and also to give a similar control over the quantity and quality of the flour carried from B into L, to be returned through $f$, to the flour elevators substantially as before described.

2. I claim the manner in which I have arranged and combined spouts $k$, $l$ pipes $b$, $b$, &c., and their slides $c$, $c$, $c$, &c., with each other and with B, F, L and M and O with F and F, with G and H, by which the flour and bran are mingled in any desired proportion and passed together into H, so as to give complete control over the action and products of H and to prevent the choking or filling up of the meshes of the bolting cloth, substantially as before described.

3. I claim also the manner in which I have combined spout $d$, with the bottom of I and top L and $g$, with the bottom of L and the burs, so as to pass to the burs, such portion of middlings as require regrinding, substantially as before described.

4. And while I do not claim as my invention the separate parts of my bolting machinery taken individually I do claim as new and of my invention, the manner of combining and arranging those parts substantially as before described, so that entire control is given over the process of bolting and now it is made one entire and continuous action and by machinery by which any desired portion of the flour in the first bolting chest B, is passed through $i$ or through $i$ and $j$, into the packing chest; and any portion thereof passed through $k$ or $l$ into L and thence through $f$, with the flour from I through $e$, to the elevators, and any portion at the miller's discretion passed through $b$, $b$ &c., into F, and the flour unbolted from M, the flour from $b$, $b$ &c., and the bran from O mingled and passed together in any proportions through G into I and H and there thoroughly bolted and separated without any choking of the meshes of the bolt, the bran passed off through J and the offal through $h$, in any required condition, the middling forced through $d$, into L and from thence through $g$, to the burs to be reground, while the flour is forced through $e$ into L, and meeting with the flour passed into L from $l$ with it carried through $f$, to the flour elevators.

A. F. MENEFEE.

Witnesses:
SAML. S. RALLZ,
JAMES F. STROTHER.